US010056637B2

(12) United States Patent
Gambini et al.

(10) Patent No.: US 10,056,637 B2
(45) Date of Patent: Aug. 21, 2018

(54) FUEL CELL HAVING A MODULAR BASE ACTIVE AREA

(71) Applicant: Nuvera Fuel Cells, Inc., Billerica, MA (US)

(72) Inventors: Filippo Gambini, Boston, MA (US); Amedeo Conti, Somerville, MA (US); Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 413 days.

(21) Appl. No.: 14/167,229

(22) Filed: Jan. 29, 2014

(65) Prior Publication Data

US 2014/0220471 A1 Aug. 7, 2014

Related U.S. Application Data

(60) Provisional application No. 61/759,738, filed on Feb. 1, 2013.

(51) Int. Cl.
*H01M 8/24* (2016.01)
*H01M 8/1004* (2016.01)
*H01M 8/249* (2016.01)
*H01M 8/02* (2016.01)

(52) U.S. Cl.
CPC ........... *H01M 8/1004* (2013.01); *H01M 8/02* (2013.01); *H01M 8/249* (2013.01)

(58) Field of Classification Search
CPC ....... H01M 8/1004; H01M 8/02; H01M 8/249
See application file for complete search history.

(56) References Cited

U.S. PATENT DOCUMENTS

2004/0157103 A1 8/2004 Takeguchi
2005/0095492 A1* 5/2005 Frank .................. H01M 8/2465
429/434

(Continued)

FOREIGN PATENT DOCUMENTS

EP 2 390 950 A2 11/2011
JP 2002-050392 2/2002

(Continued)

OTHER PUBLICATIONS

PCT Notification of Transmittal of the International Search Report and the Written Opinion of the International Searching Authority issued in International Application No. PCT/US2014/013590 dated Jul. 17, 2014 (10 pages).

(Continued)

*Primary Examiner* — Jimmy Vo
(74) *Attorney, Agent, or Firm* — Finnegan, Henderson, Farabow, Garrett & Dunner LLP.

(57) ABSTRACT

A fuel cell stack includes a plurality of fuel cells arranged in a stack configuration extending along a z-axis, wherein each fuel cell includes a membrane electrode assembly interposed between a pair of bipolar plates, and each membrane electrode assembly has a total active area measured in an x-y plane that is generally perpendicular to the z-axis. Each bipolar plate includes a plurality of common passages extending generally parallel to the z-axis. The total active area of each membrane electrode assembly includes a plurality of base active areas arranged co-planar in the x-y plane along an x-axis.

14 Claims, 9 Drawing Sheets

(56) References Cited

U.S. PATENT DOCUMENTS

| | | | | |
|---|---|---|---|---|
| 2006/0251948 A1* | 11/2006 | Facchi | ................... | H01M 8/02 |
| | | | | 429/414 |
| 2009/0023024 A1* | 1/2009 | Conti | ................. | H01M 8/0228 |
| | | | | 429/480 |
| 2011/0269042 A1 | 11/2011 | Schneider et al. | | |
| 2012/0094204 A1* | 4/2012 | Dano | ............... | H01M 8/04007 |
| | | | | 429/457 |

FOREIGN PATENT DOCUMENTS

| | | | |
|---|---|---|---|
| JP | 2004-247289 A | 9/2004 | |
| JP | 2011-243538 | 12/2011 | |
| WO | WO 1995/023436 A1 | 8/1995 | |
| WO | WO 2004/025769 A2 | 3/2004 | |
| WO | WO-2011003519 A1 * | 1/2011 | ........ H01M 8/04007 |
| WO | WO 2012/094674 A2 | 7/2012 | |

OTHER PUBLICATIONS

Examination Reported from the European Patent Office issued for European Patent Application No. 14 703 746.9 dated Jan. 11, 2017, (7 pages).
Notification of Reasons for Rejection issued in Japanese Patent Application No. 2015-556097 dated Dec. 20, 2017, (6 pages).

\* cited by examiner

FUEL CELL HAVING A MODULAR BASE ACTIVE AREA

This application claims the benefit of U.S. Provisional Application No. 61/759,738, filed Feb. 1, 2013, which is incorporated herein by reference.

The present disclosure is directed towards a fuel cell, and more particularly, to a fuel cell having a modular base active area.

Fuel cells are devices used for generating electric current from chemical reactions. A fuel cell converts the chemical energy of a fuel (e.g., hydrogen, methanol, etc.) into electricity through a chemical reaction with oxygen or another oxidizing agent. The chemical reaction typically yields electricity, heat, and water.

A basic fuel cell comprises a negatively charged anode, a positively charged cathode, and an ion-conducting material called an electrolyte. Different fuel cell technologies utilize different electrolyte materials. A Proton Exchange Membrane (PEM) fuel cell, for example, utilizes polymeric ion-conducting membrane as the electrolyte.

Fuel cell technology offers a promising alternative to traditional power sources for a range of technologies, such as, for example, transportation vehicles, portable power supply, and stationary power production. In order for fuel cells to become a more practical and widespread alternative to traditional power sources, fuel cell manufacturers must design and build inexpensive, efficient, and reliable fuel cells that are more cost and performance competitive with current alternate technologies. In the last decade the performance of fuel cells has improved while the cost has gone down, but there is a continuing need to further improve performance and reduce cost to close the gap between fuel cells and traditional power sources.

The variety of suitable applications for fuel cells requires that the capability of fuel cell performance varies to meet the specifications dictated by each application. The power produced from a fuel cell is a function of both the total current and total voltage. Individual fuel cells generally produce a relatively small electrical potential, about 0.2-1 volt, depending on the current. Therefore, to increase the total voltage and meet the requirements for a particular application, individual fuel cells are combined in series to form a fuel cell stack. The total current can be increased by increasing the surface area of the individual fuel cells within the stack.

In a PEM fuel cell stack, the PEM fuel cells are stacked together sequentially, each cell including a cathode catalyst layer, an electrolyte membrane, and an anode catalyst layer. Each cathode catalyst layer/membrane/anode catalyst layer assembly constitutes a "membrane electrode assembly" (MEA), which is typically supported on both sides by bipolar plates. Gases (hydrogen and air) are supplied to the electrodes of the MEA through channels or grooves formed in the bipolar plates.

During manufacturing, the number of fuel cells in a fuel cell stack can be adjusted based on the specific power requirements of an application. The ability to easily add or remove fuel cells to a fuel cell stack has provided fuel cell manufacturers with some manufacturing flexibility, but this is not enough flexibility to effectively meet the needs of all the different applications.

Only varying the number of fuel cells in the stack while keeping the active area of each individual fuel cell the same for all the applications can be impractical based on the disparity of total stack voltage and current requirements for different applications. For example, only varying the number of fuel cells in a stack can lead to situations where a fuel cell stack has a minimum number of fuel cells (i.e., low voltage). However, the active area of each fuel cell within the stack is large (i.e., high current).

In addition to total stack voltage and current requirements, an application can also have stringent weight and volume requirements. For example, in an automobile application (i.e., 140 KW) it is generally preferable to have higher voltages and lower currents, therefore a smaller active area per fuel cell. In automotive applications, the volume of the fuel cell stack and ancillary components can be a critical factor to consider when designing. In contrast, in the case of a stationary application (i.e., 1 MW), higher currents can easily be tolerated and the weight and volume may be of lesser importance.

To meet the needs of the fuel cell market, fuel cell manufacturers offer fuel cell stacks where the active area of the individual fuel cells used in the stack are different. Varying both the active area of the individual fuel cells and the number of cells within a fuel cell stack provides numerous combinations. This allows manufacturers to design and supply a fuel cell optimized for a particular application.

Unfortunately, the flexibility that comes from varying the active area of each fuel cell, not just the number of fuel cells, has disadvantages. Varying the active area of the fuel cell requires more design, modeling, and testing to verify the fluid-dynamics, mechanical and electrical performance of the new active area for the fuel cell. This increases design cost in addition to the additional tooling and manufacturing costs associated with the customized product offerings. Varying the active area of the fuel cell can affect the sizing and design of the bipolar plate gas feed and discharge passages, coolant channels, tie rods, gasket sealing system, etc. Therefore, additional flexibility and modularity in fuel cell and fuel cell stack design may be required to reduce the design and manufacturing cost allowing for cost effective mass production without sacrificing performance flexibility.

In consideration of the aforementioned circumstances, the present disclosure is directed toward a fuel cell and fuel cell stack design having a modular base active area that allows scaling up or down of the total active area.

One aspect of the present disclosure is directed to a fuel cell stack comprising: a plurality of fuel cells arranged in a stack configuration extending along a z-axis, wherein each fuel cell comprises a membrane electrode assembly interposed between a pair of bipolar plates, and each membrane electrode assembly has a total active area extending in an x-y plane that is generally perpendicular to the z-axis; each bipolar plate comprises a plurality of common passages extending generally parallel to the z-axis; and wherein the total active area of each membrane electrode assembly is comprised of a plurality of base active areas arranged co-planar in the x-y plane along an x-axis.

Another aspect of the present disclosure is directed to a modular fuel cell comprising: a membrane electrode assembly comprising an anode catalyst layer, a cathode catalyst layer, and a proton exchange membrane located between the anode catalyst layer and the cathode catalyst layer, wherein the anode catalyst layer, the cathode catalyst layer, and the proton exchange membrane are positioned along a z-axis and are generally parallel to an x-y plane; a pair of bipolar plates comprising commonly aligned passages that extend generally parallel to the z-axis; and wherein the membrane electrode assembly has a total active area comprising at least one of a base active area configured for co-planar arrangement in the x-y plane along an x-axis.

Another aspect of the present disclosure is directed to a method of manufacturing a fuel cell, comprising: calculating a total active area for the fuel cell based on a specification for an application, wherein the specification includes at least one of a fuel cell voltage, a fuel cell current, a fuel cell weight, and a fuel cell volume; selecting a base active area, wherein the base active area is configured for co-planar arrangement along a single axis; providing a membrane electrode assembly having the total active area, wherein the total active area comprises a multiple of the base active areas arranged co-planar along at least a single axis; and placing a pair of bipolar plates adjacent to both sides of the membrane electrode assembly, wherein each bipolar plate is comprised of sections and each section includes common passages, and the number of sections is equal to the number of base active areas forming the total active area of the membrane electrode assembly.

Another aspect of the present disclosure is directed to a method of manufacturing a fuel cell stack, the method comprising: calculating the number of fuel cells and a total active area for each fuel cell based on a specification for an application, wherein the specification includes at least one of a fuel cell stack voltage, a fuel cell stack current, a fuel cell stack weight, and a fuel cell stack volume; selecting a base active area, wherein the base active area is configured for co-planar arrangement along a single axis; assembling a stack of a plurality of membrane electrode assemblies having an area equal to the total active area calculated, where the total active area is comprised of a multiple of the base active areas arranged co-planar along at least a single axis; and inserting a plurality of bipolar plates between adjacent membrane electrode assemblies, wherein each bipolar plate is comprised of sections and each section includes common passages, and the number of sections is equal to the number of base active areas forming the total active area of each membrane electrode assembly.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Figure 5A:
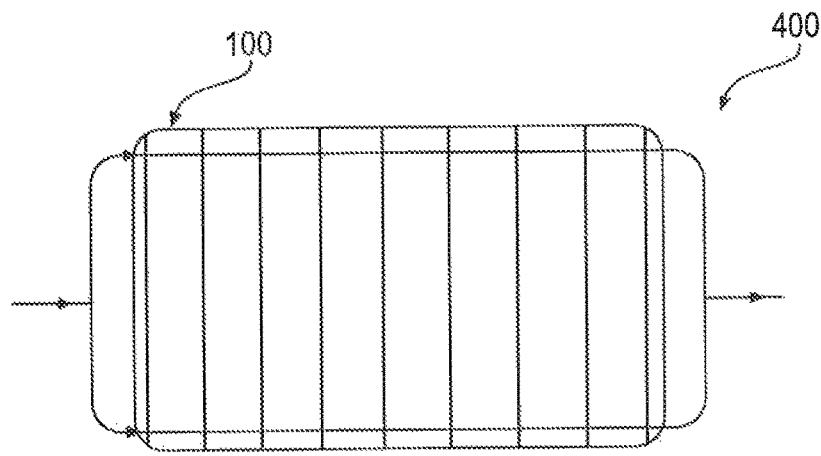
Figure 5B:
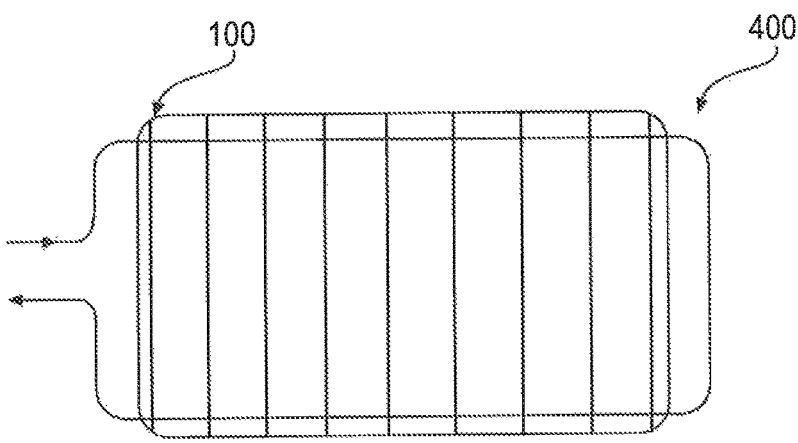
Figure 5C:
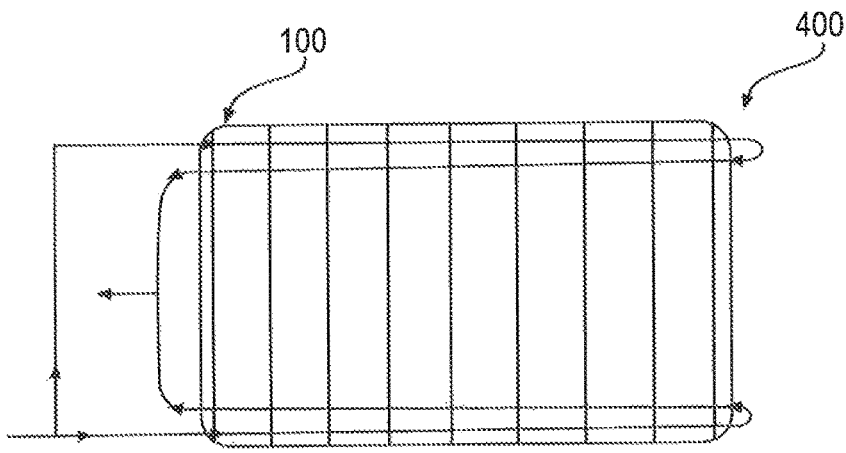

FIGS. 5A, 5B, and 5C illustrates various coolant configurations, according to an exemplary embodiment.

Figure 6A:
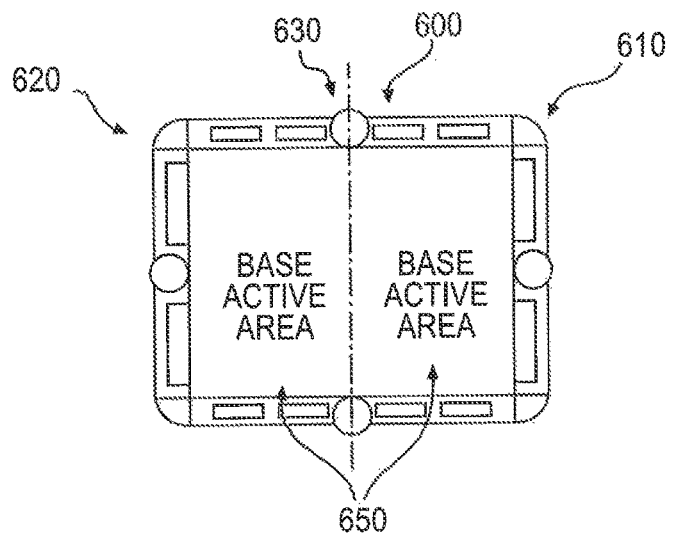
Figure 6B:
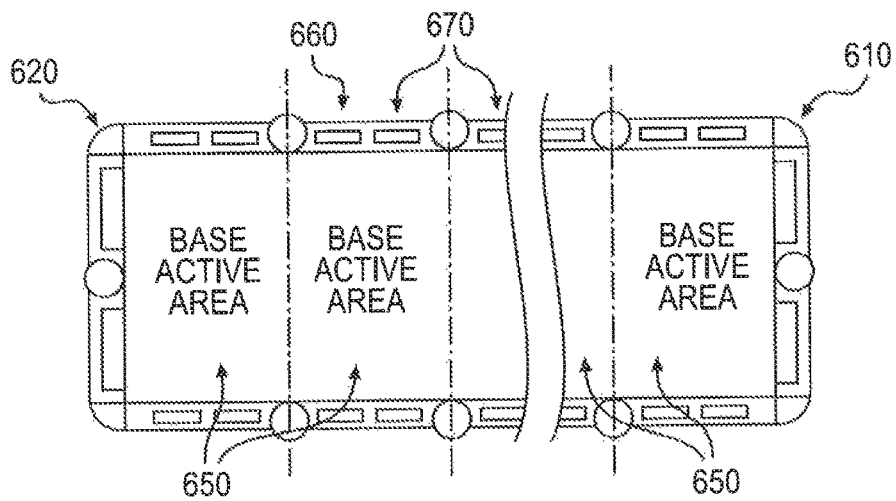
Figure 6C:
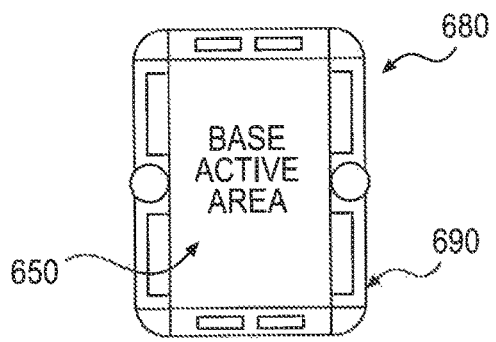

FIGS. 6A, 6B, and 6C illustrate various configurations, according to an exemplary embodiment.

Figure 7:
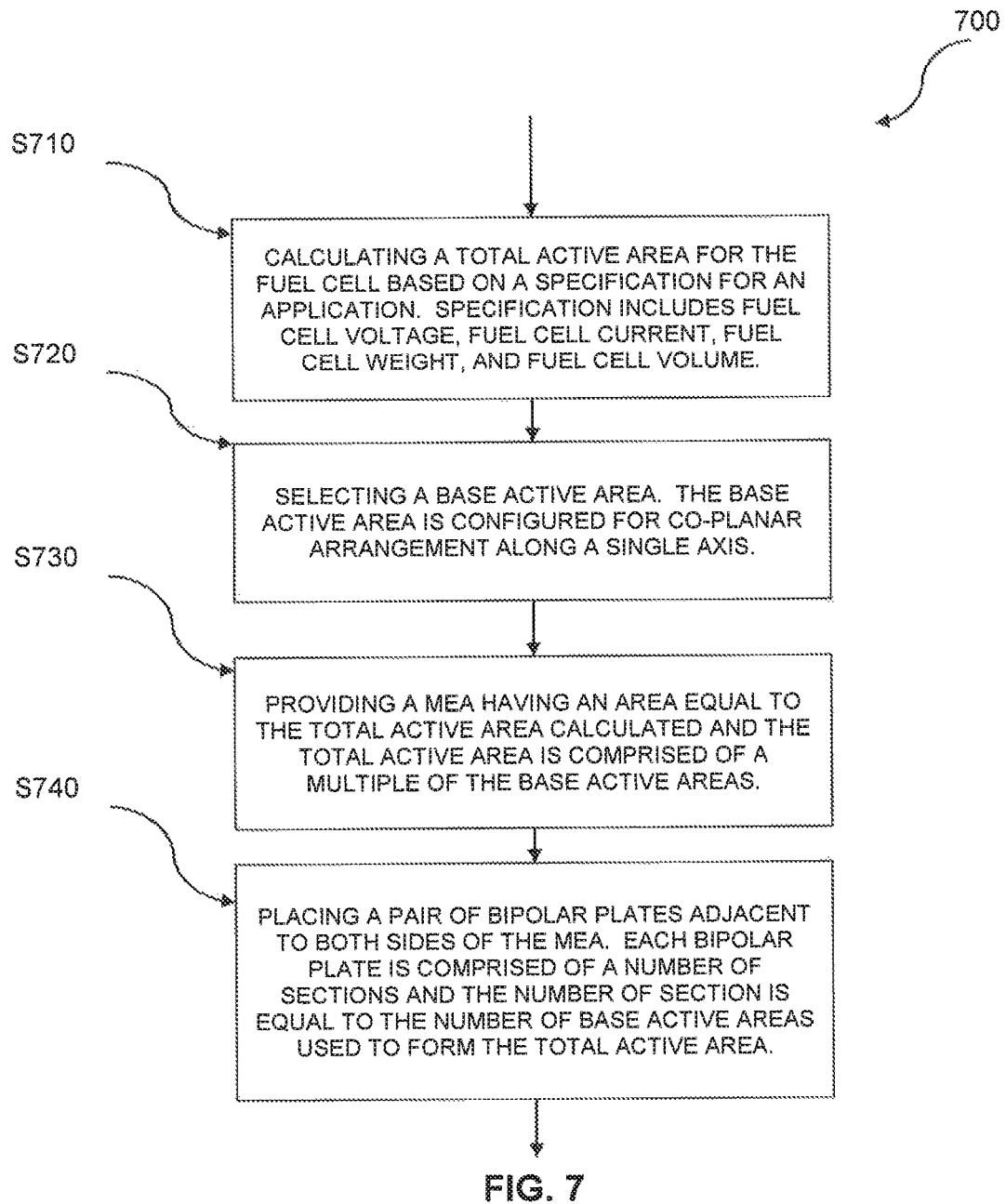

FIG. 7 is a flow diagram illustrating a method of manufacturing a fuel cell, according to an exemplary embodiment.

Figure 8:
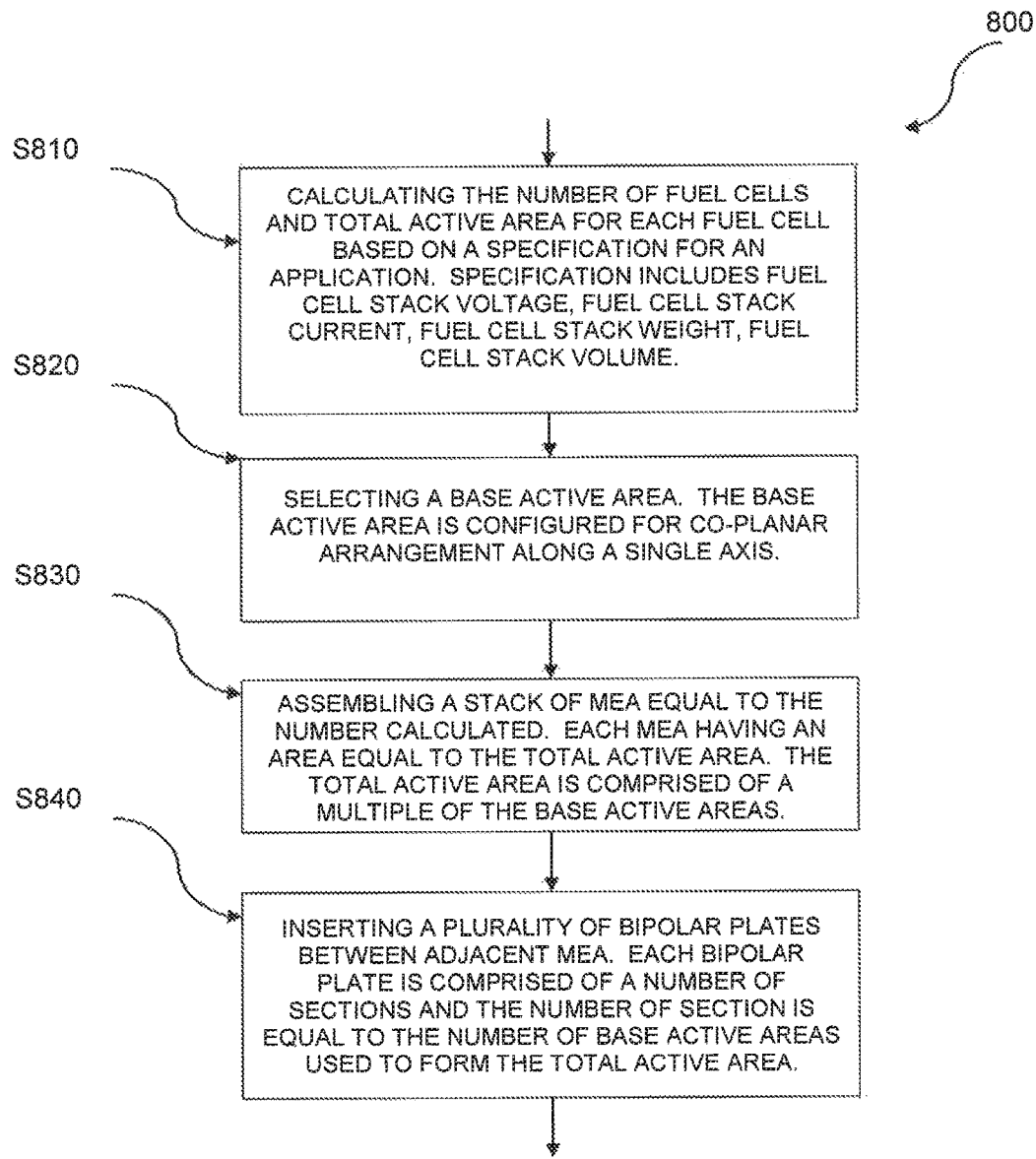

FIG. 8 is a flow diagram illustrating a method of manufacturing a fuel cell stack, according to an exemplary embodiment.

Figure 9:
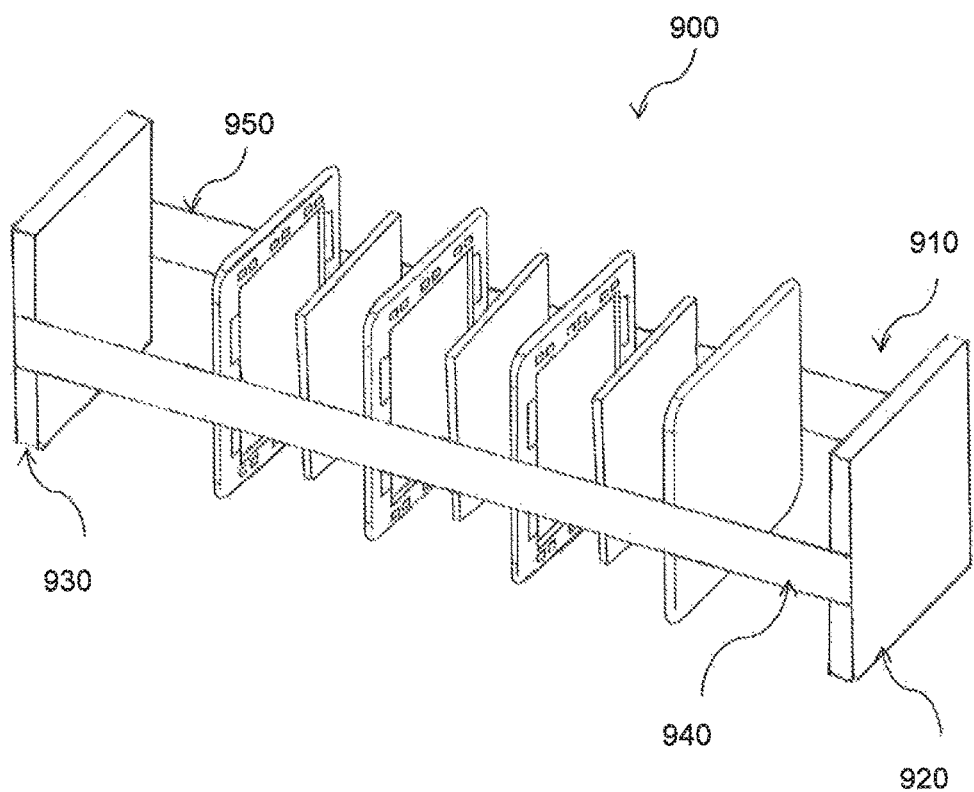

FIG. 9 is an exploded assembly of part of a fuel cell stack having an external compression system, according to an exemplary embodiment.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to a fuel cell employing hydrogen, oxygen, and water, it is understood that the devices and methods of the present disclosure can be employed with various types of fuel cells and electrochemical cells, including, but not limited to electrolysis cells, hydrogen purifiers, hydrogen expanders, and hydrogen compressors.

Throughout the specification the terms "generally parallel" and "generally perpendicular" may be used to describe the arrangement of one or more components in relation to an axis, plane, or other component. The degree of offset from parallel and perpendicular that can be tolerated when describing an arrangement as "generally parallel" or "generally perpendicular" can vary. The allowable offset may be, for example, less than about 20 degrees off, such as an offset less than about 10 degrees, an offset of less than about 5 degrees, and offset of less than about 3 degrees, an offset of less than about 2 degrees, and an offset of less than about 1 degree.

Figure 1:
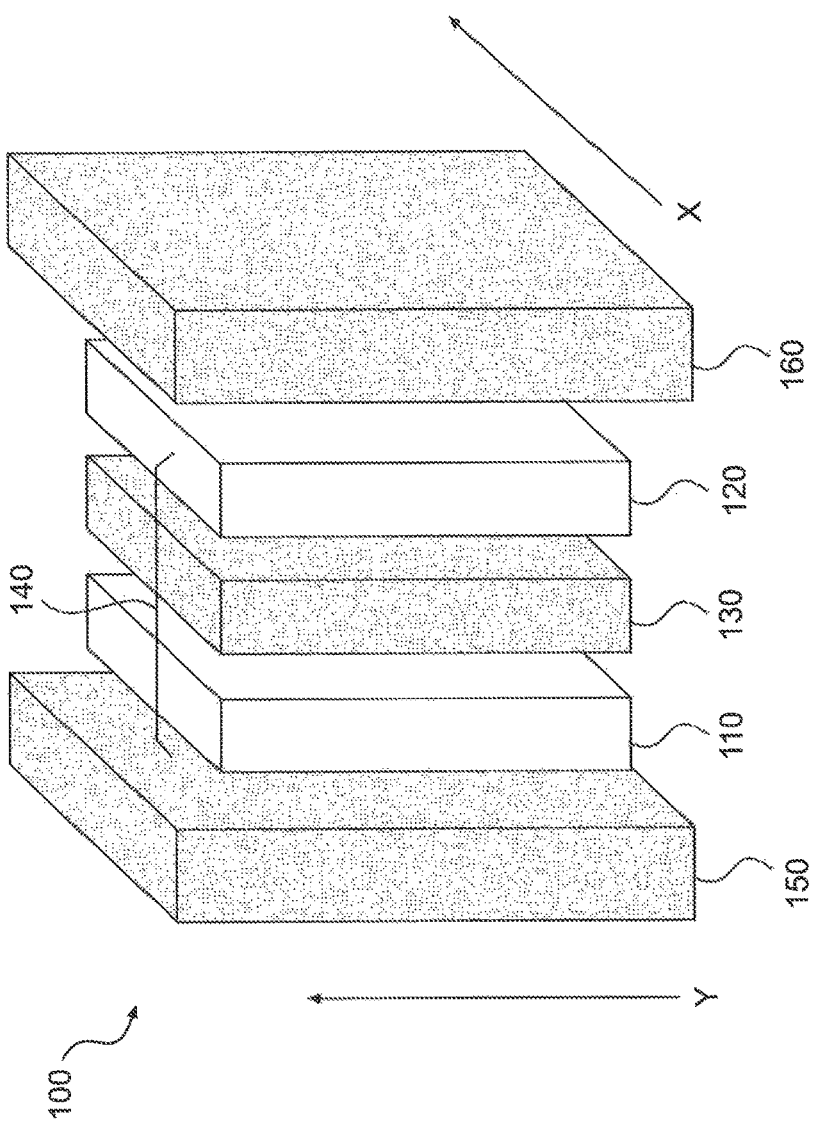
FIG. 1 is a side view of a fuel cell, showing the various components of a Proton Exchange Membrane fuel cell.

FIG. 1 shows an exploded side view of a fuel cell 100. Fuel cell 100 can comprise a cathode catalyst layer 110, an anode catalyst layer 120, and a proton exchange membrane (PEM) 130, which combined can comprise a membrane electrode assembly (MEA) 140. PEM 130 can comprise a pure polymer membrane or composite membrane where other material, for example, silica, heteropolyacids, layered metal phosphates, phosphates, and zirconium phosphates can be embedded in a polymer matrix. PEM 130 can be permeable to protons while not conducting electrons. Cathode catalyst layer 110 and anode catalyst layer 120 can comprise porous carbon electrodes containing a catalyst. The catalyst material, for example platinum, can increase the reaction of oxygen and fuel. MEA 140 thickness can be based on the thickness of PEM 130 as well as the thickness of cathode catalyst layer 110 and anode catalyst layer 120.

Fuel cell 100 can comprise two bipolar plates 150, 160. MEA 140 can be interposed between bipolar plates 150, 160. Bipolar plates 150, 160 can act as current collectors, provide access channels to the respective electrode surfaces for the fuel and the oxidant, and provide channels for the removal of water formed during operation of fuel cell 100. Bipolar plates 150, 160 can also provide access channels for cooling fluid (i.e., water, glycol, or water glycol mixture). The bipolar plates can be made from aluminum, steel, stainless steel, titanium, copper, Ni—Cr alloy, graphite or any other electrically conductive material. Bipolar plates 150, 160 can separate PEM fuel cell 100 from the neighboring fuel cells in the fuel cell stack (not shown). In some embodiments, two adjacent fuel cells in a fuel cell stack can share a bipolar plate (not shown in FIG. 1). Fuel cell 100 can have an x-axis (X) and y-axis (Y) perpendicular to each other in an x-y plane and a z-axis (Z) aligned along the stacked direction of fuel cell 100 and generally perpendicular to the x-y plane.

Figure 2:
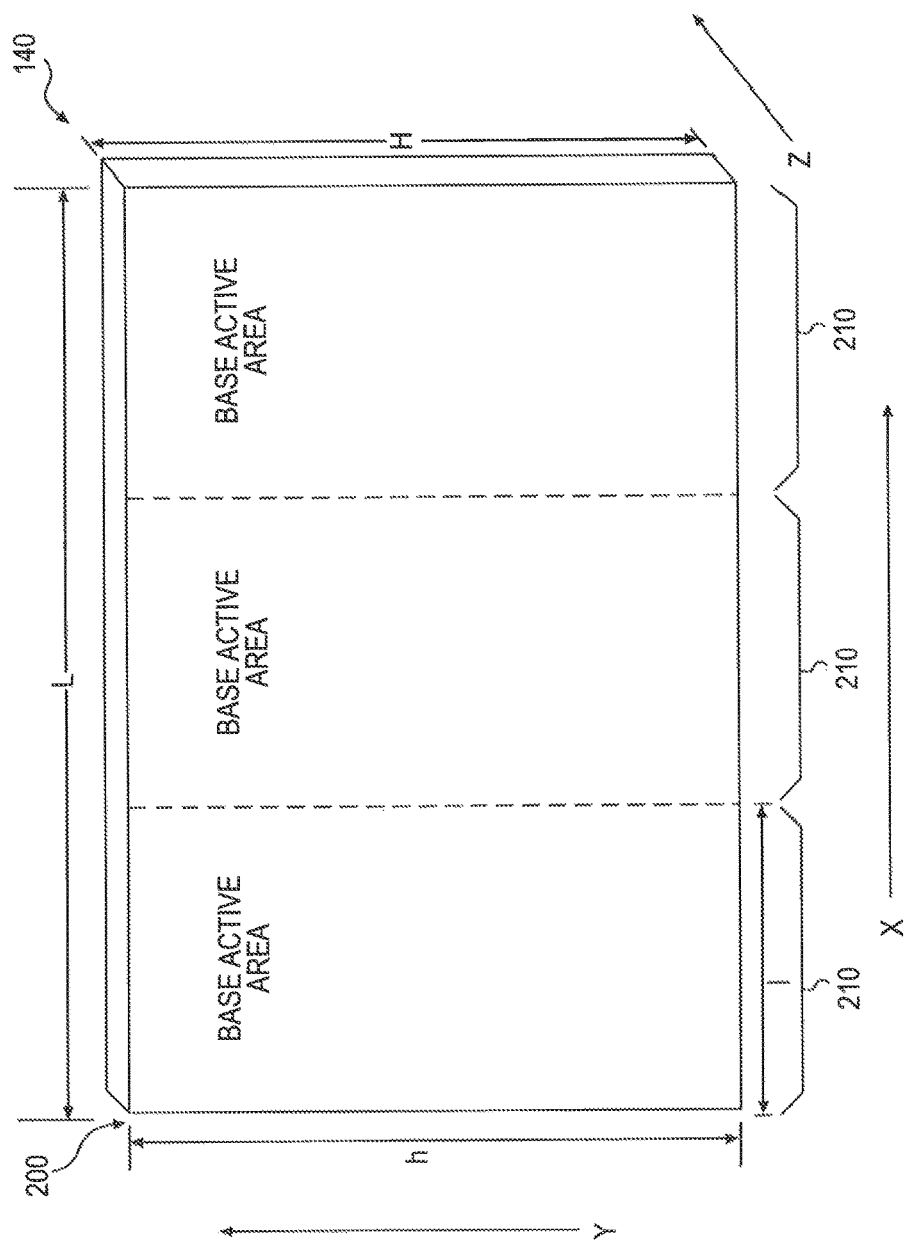
FIG. 2 illustrates a membrane electrode assembly, according to an exemplary embodiment.

FIG. 2 shows a front-view parallel to the x-y plane of MEA 140 having a total active area 200 that can extend in the x-y plane and can be equal to a total length (L) measured along the x-axis multiplied by a total height (H) measured along the y-axis. Total active area 200 can be comprised of one or more of a base active area 210 that can be modularly repeated multiply times in order to obtain the total active area 200. The base active area 210 can be configured for co-planar placement along the x-axis in relation to one or more base active area 210. In the particular embodiment illustrated in FIG. 2, total active area 200 is comprised of three of the base active areas 210. The three base active areas 210 are configured adjacent to one another extending along the x-axis co-planar in the x-y plane. Other co-planar arrangements are also contemplated.

In the embodiment shown in FIG. 2, base active area 210 can have a base height (h) that can be substantially equal to total height (H) and a base length (I) that can be substantially equal to one third the total length (L). In various other embodiments, base active area designs can be created having a range of dimensions allowing for the construction of numerous total active area designs. For example, the dimensions of the base active area 210 can range from 75 cm$^2$ to 125 cm$^2$.

Proper management of gaseous reactants, reactant products, and water/humidity can be fundamental to achieving proper performance of fuel cell 100. In order to achieve consistent performance, several parameters can be optimized. For example, the flow rate and pressure of the gaseous reactants (i.e., hydrogen and oxygen) to the MEA through the common feed passages can be optimized to achieve efficient power production. In addition, reactant products (i.e., depleted hydrogen and depleted oxygen) and liquid (water/humidity) removal from the MEA through the common discharge passages can be optimized to achieve efficient power production. Accordingly, these parameters can be optimized for a single base active area 210. Particular attention can be given to the optimization of the pressure drops through the cell in order to meet the requirements for an application.

Subsequently, by adding multiples of base active area 210 together during the design of total active area 200, the performance of total active area 200 can be projected. This analysis can be easier and more accurate based on the known optimized performance of the base active area 210. Based on the typical fuel cell design, changing the vertical dimension can alter the fluid dynamics, and thus performance and power efficiency. However, by repeating base active area 210 along the horizontal x-axis, the vertical dimension of total active area 200 remains unchanged regardless the number of base active areas 210 forming total active area 200. This allows the fluid dynamics and mechanical properties to remain substantially unchanged. In order for total active area 200 to substantially maintain the same fluid dynamics and mechanical properties as base active area 210, the common passages supplying and discharging gaseous reactants and reactant products can be modularly repeated as the base active area 210 is repeated.

It is understood that MEA 140 having a total active area 200, although made up of multiple base active areas 210, can be formed from a single continuous MEA having an area equal to total active area 200. Plates, electrodes, gaskets and other components of fuel cell 100 can similarly be formed of a single piece covering or encompassing total active area 200.

Figure 3:
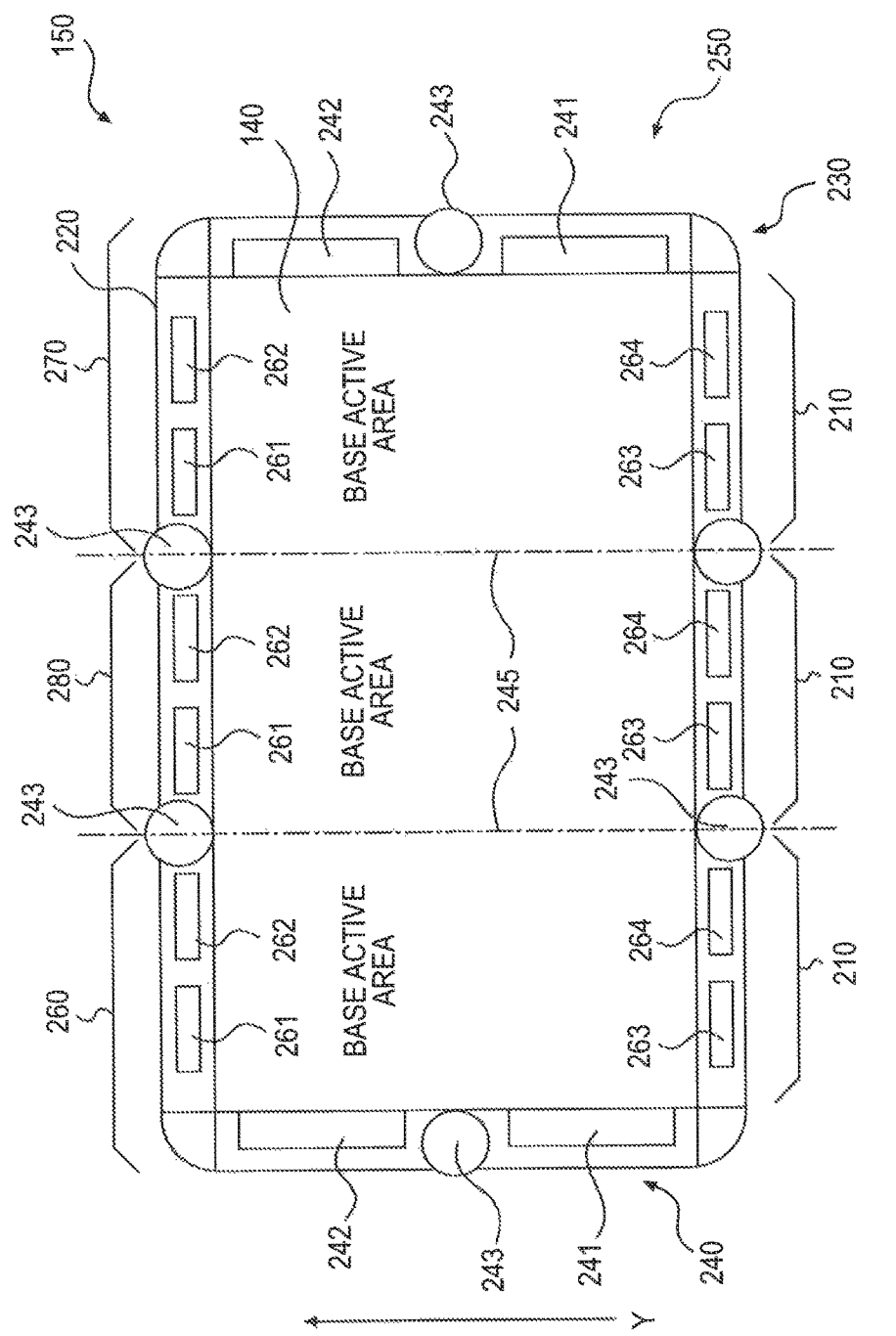
FIG. 3 is a schematic view of part of a fuel cell, according to an exemplary embodiment.

Bipolar plates 150, 160 can be configured to be similarly modular like base active area 210. FIG. 3 shows a front-view parallel to the x-y plane of MEA 140 and bipolar plate 150 of FIG. 1, according to an exemplary embodiment. A portion of MEA 140 can be delimited by bipolar plate 150. The remaining portion of MEA 140 can be delimited by bipolar plate 160 (not shown in FIG. 2). Bipolar plate 160 can be configured to be a mirror reflection of bipolar plate 150. It is understood that all the properties, aspects, and characteristics of bipolar plate 150 can be the same for bipolar plate 160.

According to an exemplary embodiment, bipolar plate 150 shown in FIG. 3 can be formed of an electrical conductive frame body having dimensions exceeding those of total active area 200 of MEA 140. Bipolar plate 150 can be generally rectangular or square in shape depending on the dimensions and number of base active areas 210 that make up the total active area 200.

In various embodiments, bipolar plate 150 can be divided into co-planar modular sections, configured for placement adjacent to one or more sections, extending along the x-axis. In this particular exemplary embodiment, bipolar plate 150 can be divided into three sections, an inner section 280 and two side sections 260, 270. Side section 270 can be configured to be a mirror reflection of side section 260. This can allow for the design and construction of side sections 260, 270 to be substantially the same. A difference could be the orientation when forming bipolar plate 150. For example, rotating side section 260 by 180 degrees orients side section 260 such that it can become side section 270. And side section 270 can be rotated 180 degrees such that it can become side section 260. It is understood that all the properties, aspects, and characteristics of side section 260 can be the same for side section 270.

Inner section 280 can be configured to be interposed between side sections 260, 270. Inner section 280 and side section 260, 270 are similarly modular like base active area 210 and each section can correspond to one of the base active area 210. Accordingly, for each modular base active area 210 that makes up total active area 200 fuel cell 100 can have a corresponding modular inner section 280 or side section 260, 270.

In various embodiments, fuel cell 100 can be comprised of any number of base active area and corresponding bipolar plate sections. For example, FIG. 6A illustrates a bipolar plate 600 comprised of two side sections 610, 620 that can be a mirror reflection of one another joined at a common plane 630. In this particular embodiment, the total active area of the MEA can be comprised of two base active areas 650 and bipolar plate 600 can be comprised of no inner section.

In another embodiment, as shown in FIG. 6B, a bipolar plate 660 can be comprised of a plurality of sections. Bipolar plate 660 can be comprised of a plurality of inner sections 670 and two side sections 610, 620 at each end. In this particular embodiment an MEA total active area can be comprised of a plurality of base active area 650. In yet another embodiment, as shown in FIG. 6C, a bipolar plate 680 can be comprised of a single section 690 that can be configured for an individual base active area 650. As illustrated by these embodiments, by utilizing base active area 650, side sections 610, 620, inner section 670, and single section 690, a fuel cell with a total active area of any multiply of the base active area 650 can be assembled.

In alternate embodiments, bipolar plates can be formed of a single structure instead of one or more sections. To accommodate the differing size of the total active area different size single structure bipolar plates can be constructed. For example, there can be bipolar plates sized for a single base active area, two base active areas, three base active area, four base active area, etc. Although comprised of a single structure, the bipolar plates design can still utilize modular sections with modularly repeated common passages as part of the designing phase.

It is understood that the base active area 210 and the bipolar plate 150 sections (inner section 280 and side sections 260, 270) that can be configured for co-planar placement adjacent to another can refer to placement taking place during the design, manufacture or assembly phase for fuel cell 100.

Figure 4:
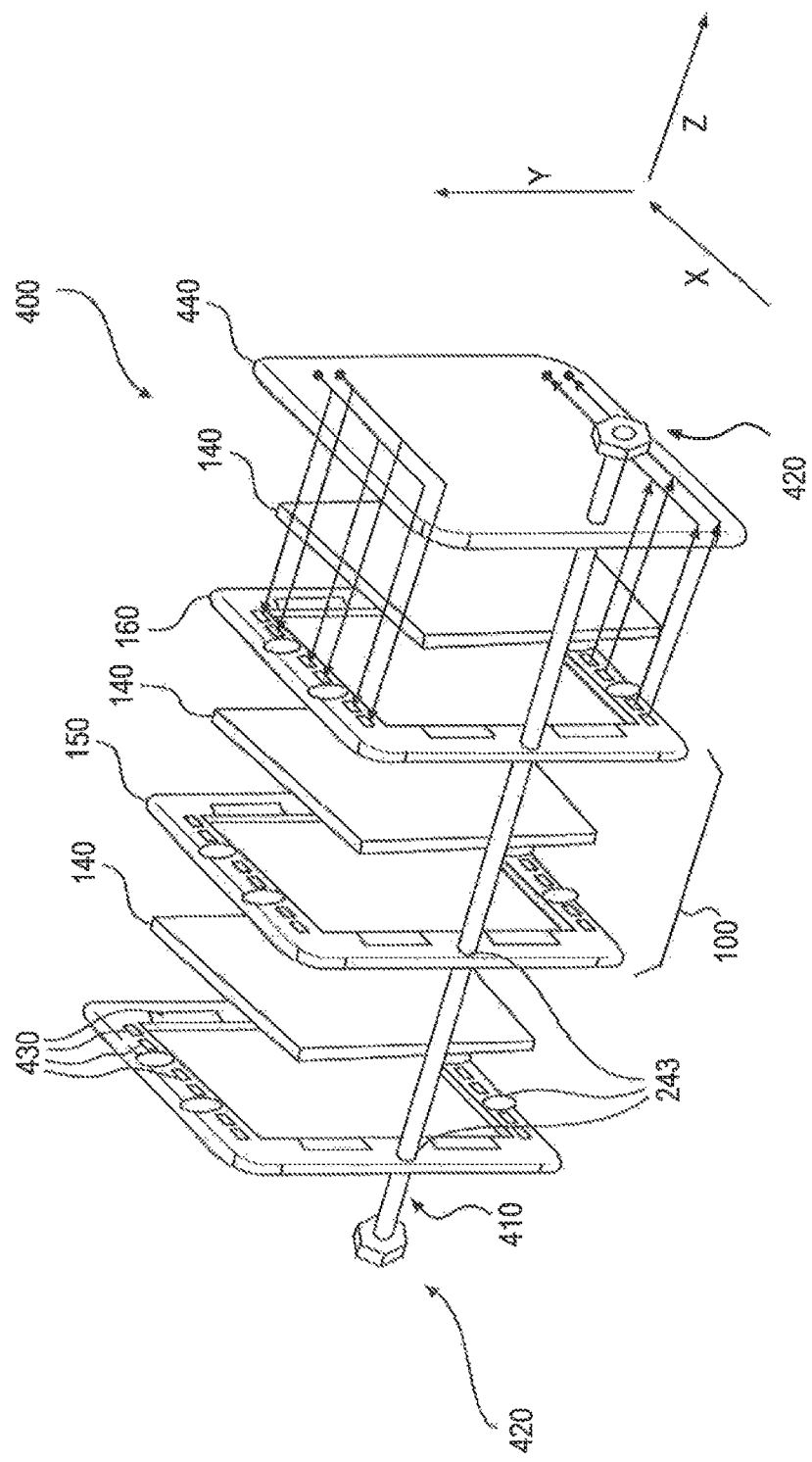
FIG. 4 is an exploded assembly of part of a fuel cell stack, according to an exemplary embodiment.

In accordance with an exemplary embodiment, FIG. 4 illustrates a part of a fuel cell stack 400 that can be comprised of a plurality of fuel cell 100 arranged in a stack configuration extending along z-axis. As described earlier with regard to FIG. 1, each fuel cell 100 can include MEA 140 interposed between bipolar plates 150, 160. In the particular embodiment illustrated in FIG. 4, two adjacent fuel cells 100 in fuel cell stack 400 can share bipolar plates 150, 160.

Bipolar plates 150, 160 can be comprised of a plurality of common passages 430 for feeding gaseous reactants to MEA 140 and discharging reactant products from MEA 140. The plurality of common passages 430 can extend generally parallel at least part of the length of fuel cell stack 400 along the z-axis. At each end of fuel cell stack 400 can be an end plate 440 configured to distribute and consolidate the plurality of common passages. For example, the end plate can receive an incoming flow of hydrogen and an incoming flow of oxygen gas and be configured to distribute the flows to the one or more common passages configured to distribute the hydrogen and oxygen gas to each fuel cell. In addition, the end plate can also be configured to consolidate the one or more reactant product flows into a discharge flow of depleted fuel and a discharge flow of depleted oxygen.

In addition, to the common passages each bipolar plate 150, 160 can be comprised one or more tie rod passages 243 configured for receiving one or more stack tie rods 410. Tie rod passages 243 can be configured so the stack tie rods 410 pass through corresponding tie rod passages within bipolar plates 150, 160 of fuel cell stack 400. The stack tide rods 410 can be used to compress the entire fuel cell stack 400 by tightening at least one pair of fasteners 420 at each end of fuel cell stack 400.

According to an exemplary embodiment, as shown in FIGS. 3 and 4, bipolar plate 150 can be comprised of a plurality of tie rod passages 243 configured to receive a plurality of stack tie rods 410. In various embodiments, additional tie rods and corresponding tie rod passages can be used to provide even and adequate compression of the stack.

In an alternate embodiment shown in FIG. 9, fuel cell stack 900 can be compressed using an external compression system 910. For example, tie rods and tie rod passages may be replaced with external compression system 910. External compression system 910 can comprise at least two end plates 920, 930 and at least two compression connecting bars 940, 950. End plates 920, 930 can be placed adjacent to each end of fuel cell stack 900 and connected by compression connecting bars 940, 950. Compression connecting bars 940, 950 can be configured to contract the distance between end plates 920, 930, and as a result, compress the fuel cell stack 900 positioned between end plates 920, 930. By using external compression system 910, bipolar plates within fuel cell stack 900 can be configured without a plurality of tie rod passages. Eliminating the plurality of tie rod passages from the bipolar plates can allow for simplification of the bipolar plate design.

With MEA 140 positioned on bipolar plate 150 as shown in FIG. 3, the border region of bipolar plate 150 that extends beyond MEA 140 can appear as four exterior walls, an upper wall 220, a lower wall 230, a left wall 240, and a right wall 250. Upper wall 220 can be comprised of at least one of a first feed passage 261 and at least one of a second feed passage 262 within each section of bipolar plate 150. First feed passage 261 and second feed passage 262 can be configured for feeding gaseous reactants to MEA 140. First feed passage 261 and second feed passage 262 within each section of bipolar plate 150 can be adjacent to one another and distributed generally evenly along the x-axis within upper wall 220. The gaseous reactants supplied to MEA 140 can be fuel and air/oxygen. Fuel can include hydrogen, methanol or any suitable combination. For example, first feed passage 261 can supply hydrogen gas and second feed passage 262 can supply oxygen gas. Each first feed passage 261 and second feed passage 262 within each section of bipolar plate 150 can be sized to supply suitable amounts of gaseous reactants to the base active area 210 of MEA 140 encompassed by the corresponding section. For example, first feed passage 261 and second feed passage 262 along with the bipolar plate channels (not shown) within left section 260 can be sized to provide optimal amounts of gaseous reactants to base active area 210 encompassed by side section 260.

Lower wall 230 can be comprised of at least one of a first discharge passage 263 and at least one of a second discharge passage 264 within each section of bipolar plate 150. First discharge passage 263 and second discharged passage 264 can be configured for discharging reactant products from MEA 140. First discharge passage 263 and second discharge passage 264 within each section of bipolar plate 150 can be adjacent to one another and distributed generally evenly along the x-axis within lower wall 230. Reactant products from MEA 140 can include depleted oxygen, water, depleted fuel or combination of the products. For example, first discharge passage 263 can discharge depleted oxygen and water and second discharge passage 264 can discharge depleted fuel. Each first discharge passage 263 and second discharge passage 264 within each section of bipolar plate 150 can be sized to discharge suitable amounts of reactant products from base active area 210 encompassed by the corresponding section. For example, first discharge passage 263 and second discharge passage 264 along with the bipolar plate channels (not shown) within left section 260 can be sized to discharge optimal amounts of reactant products from base active area 210 encompassed by side section 260.

The shape of each first feed passage 261, second feed passage 262, first discharge passage 263, and second discharge passage 264 can be a rectangle, square, quadrilateral, oval, circular, or other various shapes. The dimensions of each first feed passage 261, second feed passage 262, first discharge passage 263, and second discharge passage 264 can be sized to allow for optimal gas and water management of each base active area 210 encompassed within the corresponding section.

Supplying too little gas to MEA 140 can cause the fuel cell 100 to operate below maximum efficiency, while supplying too much gas can cause drying out of MEA 140.

In this particular exemplary embodiment the feed passages are formed in upper wall 220 while the discharge passages are formed in lower wall 230. However, in alternate embodiments the configuration of the feed passages and discharge passages can be varied such that at least one feed passage and at least one discharge passage is formed in upper wall 220 and at least one feed passage and at least one discharge passage is formed in lower wall 230. Yet another possible configuration can include all feed passages formed in lower wall 230 and all discharge passages formed in upper wall 220.

Each first feed passage 261, second feed passage 262, first discharge passage 263, and second discharge passage 264 can be configured to connect with channels (not shown) on the face of bipolar plates 150, 160 that define paths for the gaseous reactants to be carried from the feed passages to the electrodes within MEA 140 and define paths for the reactant products to be carried from the electrodes within MEA 140 to the discharge passages. The channels, like the feed and discharge passages, can be modularly repeated based on the number of base active area 210 making up the total active area 200.

According to an exemplary embodiment, left wall 240 and right wall 250 can each comprise at least one of a first coolant passage 241 and at least one of a second coolant passage 242. First coolant passage 241 and second coolant passage 242 can be configured to allow coolant fluid to be pumped through the passages to remove the heat generated in MEA 140 during the operation of fuel cell 100. First coolant passage 241 and second coolant passage 242 can be distributed evenly in left wall 240 and right wall 250 extending parallel along the y-axis.

The shape of first coolant passage 241 and second coolant passage 242 can be a rectangle, square, quadrilateral, oval, circular, or other various shapes. The shape selected can be configured to maximize surface interaction with MEA 140 to enhance heat transfer. The dimensions of first coolant passage 241 and second coolant passage 242 can be sized to allow adequate flow of coolant fluid so proper temperature control of fuel cell 100 can be maintained limiting the possibility of overheating.

FIGS. 5A, 5B, and 5C illustrate various embodiments and configurations for coolant flow through fuel cell stack 400 configured for removing heat generated in MEA 140. Coolant fluid can be pumped through fuel cell stack 400 in a closed-loop system, which can comprise a coolant pump and a heat exchanger (not shown). The continuous flow of coolant through fuel cell stack 400 can remove heat and carry the heat to the heat exchanger where it can be transferred to the ambient environment. FIG. 5A illustrates how coolant fluid can be pumped through the fuel cell stack in parallel, or in series, as illustrated in FIG. 5B. The coolant as it enters each side of fuel cell stack 400, as shown in FIGS. 5A and 5B, can be split into a plurality of coolant passages, for example, first coolant passage 241 and second coolant passage 242.

In an additional embodiment illustrated in FIG. 5C, coolant fluid can be pump down one side of fuel cell stack 400 through one passage and then be looped back down a second passage on the same side of fuel cell stack 400. Configurations as described in FIGS. 5A, 5B, and 5C can allow for the elimination of separate cooling channels/plates between fuel cells within the stack, which simplifies the cell architecture and enables the total active area of the fuel cell to be modularly scaled up or down without the need to redesign or reconfigure the cooling components of the fuel cell stack.

In alternate embodiments, fuel cell 100 can be cooled by conductive cooling, convective cooling or other means that do not require a coolant flowing through first coolant passage 241 and second coolant passage 242 of the bipolar plates 150, 160. Therefore, in these alternate embodiments the coolant passages can be removed from bipolar plates 150, 160.

As shown in FIGS. 3 and 4, bipolar plate sections which can include, side section 260, side section 270, and inner section 280. These sections can each have substantially identical feed passages for gaseous reactants and discharge passages for reactant products sized to meet the needs of base active area 210 within each corresponding section. However, it is also possible that gaseous reactants supplied from one section can flow and be consumed in another section. In various embodiments, fuel cell 100 can be designed such that gaseous reactants once supplied to MEA 140 can flow throughout MEA 140 and likewise, reactant products once produced can flow throughout MEA 140 and be discharged through any of the discharge passages.

Generally, the combined capacity of the feed passages and discharge passages in all the sections of bipolar plates 150, 160 can be sufficient for the total active area 200 of MEA 140. As described above, this can be achieved by modularly repeating additional feed passages and discharges passages sized for each additional base active area.

Similarly to the feed and discharge passage configuration, passages for the tie rods can also be configured to modularly scale based on the number of base active area 210. According to an exemplary embodiment, as shown in FIGS. 3 and 4, left wall 240 and right wall 250 can each have at least one tie rod passage 243 for a stack tie rod 410. In addition, upper wall 220 and lower wall 230 can both include at least one tie rod passage 243 that can be located along each seam 245 located between sections. Seams 245 theoretically divide the total active area 200 of MEA 140 into base active area 210 sections. Accordingly, the number of tie rod passages 243 in upper wall 220 can be one less than the number of base active area 210 making up the total active area 200. Similarly, the number of tie rod passages in lower wall 230 can be one less than the number of base active area 210 making up the total active area 200.

In alternate embodiments, the cross-sectional area of the feed passages and discharge passages can be sized based on both the size of the base active area and the number of fuel cells within the fuel cell stack. Since common feed passages and discharge passages can be used to supply all the fuel cells in the stack, the number of cells can affect the overall flow rate capacity of the common passages. For example, a fuel cell stack comprised of 100 fuel cells can have passages with a greater cross-sectional area capable of higher flow rates than that of a fuel cell stack with 10 of the same fuel cells. By further optimizing the cross-sectional area of the common passages based on the number of cells the overall volume of the fuel cell can be optimized. Optimizing the dimensions of the feed passages and discharge passages based on the number of fuel cells can include modifying only the vertical dimensions and leaving the horizontal dimensions fixed.

In alternate embodiments, the coolant passages 241, 242 within side sections 260, 270 can be sized depending on the number of base active area and corresponding inner sections separating the side sections. For example, the greater the number of base active area and corresponding inner sections the further the heat has to travel to reach the side section where it can be discharged. Therefore, the coolant passages can increase in size and cooling capacity based on the number of inner sections. In yet another embodiment, instead of varying the size of the coolant passages the temperature and the flow rate of the coolant can be adjusted to compensate for the number of base active area and corresponding inner sections.

FIG. 7 shows a flow chart 700, for a method of manufacturing a modular fuel cell, in accordance with various embodiments described above. Flow chart 700 can include step S710, which can comprise calculating a total active area for a fuel cell based on a specification for an application. The specification for an application can comprise a fuel cell voltage, a fuel cell current, a fuel cell weight, and a fuel cell volume.

Following step S710, step S720 can comprise selecting a base active area. The base active area can be configured for co-planar arrangement along at least a single axis. For example, the embodiments described above the base active area can be arranged along the x-axis as illustrated in FIG.

2. Following step S720, step S730 can comprise providing an MEA having an active area. The active area can be equal to the calculated total active area and comprise multiples of the base active area selected. In various embodiments, the active area provided can comprise any number of base active areas combined in a co-planar arrangement.

Following step S730, step S740 can comprise placing a pair of bipolar plates for placement adjacent to both sides of the MEA. The pair of bipolar plates can be sized to correspond to the size of the MEA. The pair of bipolar plates can be comprised of sections as described above according to exemplary embodiments. Each section can include common passages. The number of sections can be based on the number of base active area used to form the total active area of the MEA. For example, if the total active area is made up of two base active area than each of the pair of bipolar plates can be assembled using two sections wherein each section includes common passages. Similarly, if the total active area includes three base active areas than each pair of bipolar plates can be assembled using three sections (i.e., one inner section and two side sections).

FIG. 8 shows a flow chart 800, for a method of manufacturing a modular fuel cell stack, in accordance with various embodiments. Flow chart 800 can include step S810, which can comprise calculating the number of fuel cells and a total active area for each fuel cell based on a specification for an application. The specification for an application can comprise a fuel cell stack voltage, a fuel cell stack current, a fuel cell stack weight, and a fuel cell stack volume.

Following step S810, step S820 can comprise selecting a base active area. The base active area can be configured for co-planar arrangement along at least a single axis. For example, the embodiments described above the base active area can be arranged along the x-axis as illustrated in FIG. 2. After step S820, step S830 can comprise assembling a stack of MEA equal to the number of fuel cells calculated. Each MEA having an active area. The active area of each MEA can be equal to the calculated total active area and comprise multiples of the base active area selected. In various embodiments, the total active area can comprise any number of base active areas combined in a co-planar arrangement.

Following step S830, step S840 can comprise inserting a plurality of bipolar plates between adjacent MEAs. Each bipolar plate can be sized to correspond to the size of the MEA. The pair of bipolar plates can comprise sections as described above according to exemplary embodiments. Each section can include common passages. The number of sections can be based on the number of base active area used to form the total active area of the MEA.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A fuel cell stack comprising:
   a plurality of fuel cells arranged in a stack configuration extending along a z-axis, wherein each fuel cell comprises a membrane electrode assembly interposed between a pair of bipolar plates, and each membrane electrode assembly has a total active area extending in an x-y plane that is generally perpendicular to the z-axis;
   each bipolar plate comprises a plurality of common passages extending generally parallel to the z-axis; and
   wherein the total active area of each membrane electrode assembly is comprised of a plurality of base active areas arranged co-planar in the x-y plane along an x-axis;
   wherein the plurality of common passages comprise:
      at least one first feed passage and at least one second feed passage per base active area;
      at least one first discharge passage and at least one second discharge passage per base active area;
      at least one first coolant passage and at least one second coolant passage.

2. The fuel cell stack of claim 1, wherein a height measured along a y-axis of the total active area is equal to a height measured along the y-axis of the plurality of base active areas; and
   a length measured along the x-axis of the total active area is equal to a multiple of a length measured along the x-axis of the plurality of base active areas.

3. The fuel cell stack of claim 1, further comprising tie rod passages wherein the number of tie rod passages is a multiple of a total number of plurality of base active areas forming the total active area.

4. The fuel cell stack of claim 1, wherein the feed passages and discharge passages are distributed along an upper and a lower border region extending along the x-axis of each bipolar plate, and the coolant passages are distributed along a left and a right border region extending along the y-axis of each bipolar plate.

5. The fuel cell stack of claim 1, wherein the feed passages are sized to supply sufficient quantities of gaseous reactant and discharge passages are sized to discharge sufficient quantities of reactant products to and from at least one of the base active area of the membrane electrode assembly to allow for efficient fuel cell performance.

6. The fuel cell stack of claim 1, wherein each bipolar plate further comprises:
   two side sections and at least one inner section;
   wherein each of the side sections and the at least one inner section delimits a portion of the total active area substantially equal to one of the plurality of base active areas; and
   wherein each of the sides sections and the inner section includes a separate first feed passage, second feed passage, first discharge passage, and second discharge passage.

7. The fuel cell stack of claim 6, wherein each side section is a mirror reflection of the other side section and comprises at least one feed passage, at least one discharge passage, and at least one tie rod passage.

8. The fuel cell stack of claim 7, wherein each inner section comprises at least one feed passage, at least one discharge passage, and a portion of a tie rod passage.

9. The fuel cell stack of claim 8, wherein the portion of a tie rod passage is aligned with another portion of a tie rod passage that is part of an adjacent section to form a complete tie rod passage.

10. The fuel cell stack of claim 6, wherein the total number of the side sections and the at least one inner sections that form each of the bipolar plates is equal to the number of base active areas combined to form the total active area.

11. The fuel cell stack of claim 6, wherein the side sections and at least one inner section are configured for co-planar attachment parallel to the x-y plane and extending along the x-axis.

12. The fuel cell stack of claim 1, further comprising at least one end plate positioned at an end of the fuel cell stack, wherein the at least one end plate is configured to distribute gaseous reactant flows to the corresponding common passages and consolidate reactant product flows from the corresponding common passages.

13. The fuel cell stack of claim 1, wherein the fuel cell stack is configured to be compressed by an external compression system.

14. The fuel cell stack of claim 1, wherein the plurality of base active areas arranged co-planar in the x-y plane along an x-axis for a continuous total active area.

* * * * *